United States Patent
Staff et al.

(10) Patent No.: US 10,160,614 B1
(45) Date of Patent: Dec. 25, 2018

(54) BANKNOTE FOREIGN OBJECT DETECTION USING PRESSURE SENSING ARRAY

(71) Applicant: NCR Corporation, Duluth, GA (US)

(72) Inventors: Philip Keith Staff, Dunfermline (GB); Alexander Stuart MacDonald, Dundee (GB)

(73) Assignee: NCR Corporation, Atlanta, GA (US)

(*) Notice: Subject to any disclaimer, the term of this patent is extended or adjusted under 35 U.S.C. 154(b) by 0 days.

(21) Appl. No.: 15/794,812

(22) Filed: Oct. 26, 2017

(51) Int. Cl.
| | | |
|---|---|---|
| *B65H 7/06* | (2006.01) |
| *G01L 1/18* | (2006.01) |
| *G01V 9/00* | (2006.01) |
| *G07D 7/023* | (2016.01) |
| *G07D 7/189* | (2016.01) |
| *G07D 7/187* | (2016.01) |
| *G07D 7/026* | (2016.01) |

(52) U.S. Cl.
CPC ............... B65H 7/06 (2013.01); G01L 1/18 (2013.01); G01V 9/00 (2013.01); G07D 7/023 (2013.01); G07D 7/026 (2013.01); G07D 7/187 (2013.01); G07D 7/189 (2017.05); *B65H 2511/521* (2013.01); *B65H 2515/34* (2013.01)

(58) Field of Classification Search
CPC  B65H 2511/521; B65H 7/06; B65H 2515/34; G01L 1/18; G07D 7/023; G07D 7/026; G07D 7/189; G07D 7/187
See application file for complete search history.

(56) References Cited

U.S. PATENT DOCUMENTS

| | | | | |
|---|---|---|---|---|
| 4,883,264 A * | 11/1989 | Yoshikawa | ............... | G07D 7/04 271/110 |
| 7,953,349 B2 * | 5/2011 | Fukai | ................. | G03G 15/2025 219/216 |
| 8,028,990 B2 * | 10/2011 | Miyamoto | ............... | B65H 7/02 271/265.04 |
| 8,651,481 B2 * | 2/2014 | Woodford | ............... | G07D 7/164 271/262 |
| 8,854,056 B1 * | 10/2014 | Furuhira | ................. | G01N 27/22 271/227 |
| 9,394,137 B2 * | 7/2016 | Ando | ...................... | B65H 31/26 |
| 2015/0168238 A1 * | 6/2015 | Raut | .................... | G01N 27/048 702/42 |

FOREIGN PATENT DOCUMENTS

JP         08030843 A  *  2/1996

* cited by examiner

*Primary Examiner* — Luis A Gonzalez
(74) *Attorney, Agent, or Firm* — Schwegman, Lundberg & Woessner

(57) ABSTRACT

An automated teller machine can use an array of pressure sensors, such as piezo-resistive sensors, to detect the presence of foreign objects, such as staples, paper clips, or rubber bands, in a stack of banknotes. A user can insert a stack of banknotes into an automated teller machine. A pair of opposing clamping surfaces can apply pressure to the stack of banknotes. An array of pressure sensors can sense non-uniformities in pressure over the area of the array. If circuitry coupled to the pressures sensors senses a presence of a high pressure area in the surface area of the banknotes, then the circuitry can generate a signal indicating that one or more foreign objects has been detected. The automated teller machine can then prompt the user to remove the stack of banknotes and remove the foreign object from the stack of banknotes.

17 Claims, 4 Drawing Sheets

US 10,160,614 B1

BANKNOTE FOREIGN OBJECT DETECTION USING PRESSURE SENSING ARRAY

TECHNICAL FIELD

The present disclosure relates to detecting the presence of one or more foreign objects in a stack of banknotes.

BACKGROUND

Foreign objects, such as staples, paper clips, or rubber bands, can potentially damage one or more banknote-handling elements inside an automated teller machine. There is ongoing effort to improve detection of these foreign objects, so that the automated teller machine can prompt the user to remove the foreign objects.

SUMMARY

In a first example, a system can include: a housing having a port that is sized and shaped to receive a stack of banknotes; a pair of opposing clamping surfaces positioned inside the housing and configured to controllably apply pressure to the stack of banknotes; an array of pressure sensors positioned on at least one of the pair of opposing clamping surfaces and configured to measure the applied pressure across a surface area of the stack of banknotes; and circuitry positioned in the housing, coupled to the array of pressure sensors, and configured to: sense a presence of a high pressure area in the surface area of the banknotes; and generate a signal indicating that one or more foreign objects has been detected in the stack of banknotes.

In a second example, a method can include: detecting a foreign object present within a stack of received banknotes upon sensing, by an array of pressure sensors, a high pressure area within a surface area of the stack of banknotes to which a pressure is applied by a pair of opposing clamping surfaces within which the array of pressure sensors is present; and outputting a signal indicating that at least foreign objects has been detected in the stack of banknotes.

In a third example, a system can include: a housing having a port configured to receive a stack of banknotes; a pair of opposing clamping surfaces positioned inside the housing and configured to controllably apply pressure to the stack of banknotes; an array of pressure sensors positioned on at least one of the pair of opposing clamping surfaces and configured to measure the applied pressure across a surface area of the stack of banknotes; circuitry positioned in the housing, coupled to the array of pressure sensors, and configured to sense the absence of a high pressure area in the surface area of the banknotes; and a processing mechanism configured to receive the stack of banknotes from the pair of opposing clamping surfaces and mechanically process the banknotes in the stack of banknotes, one at a time.

BRIEF DESCRIPTION OF THE DRAWINGS

The present disclosure is illustrated by way of example and not limitation in the figures of the accompanying drawings, in which like reference numbers indicate similar elements.

Figure 1:
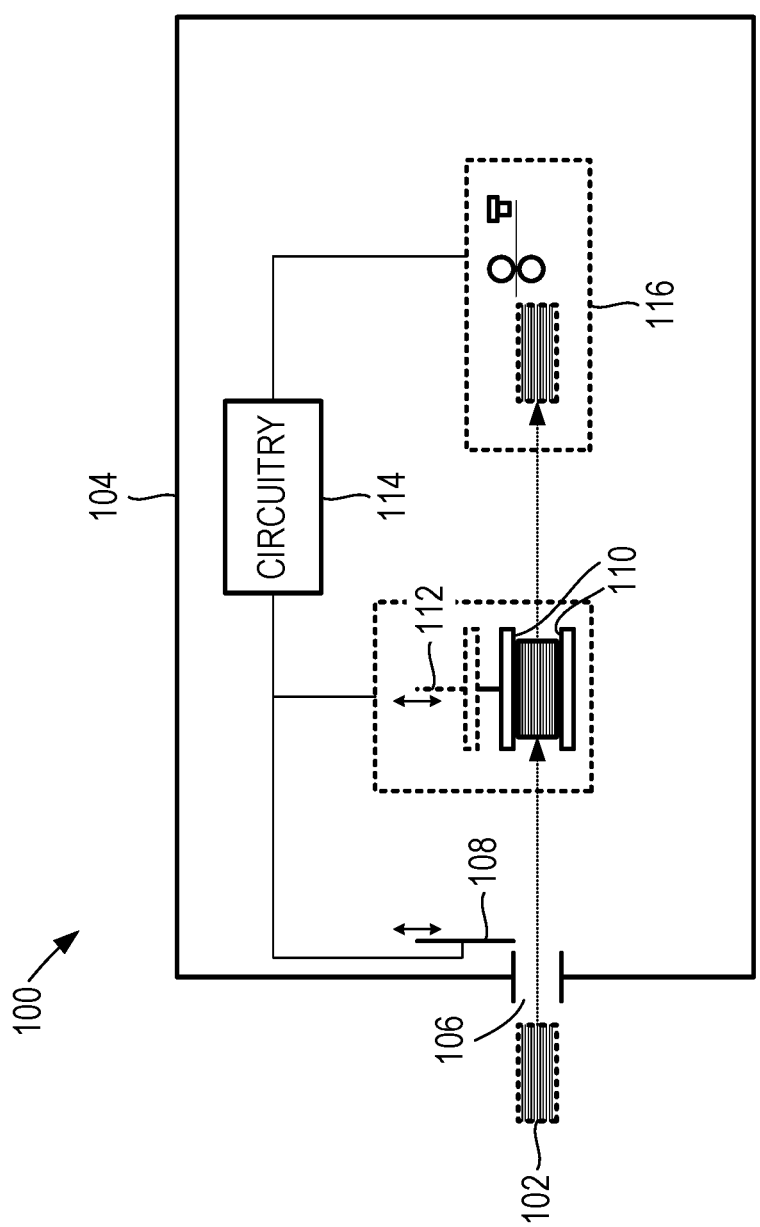
FIG. 1 shows an example of a system that can detect the presence of a foreign object in a stack of banknotes, in accordance with some embodiments.

It should be noted that elements in the drawings are not necessarily drawn to scale. The configurations shown in the drawings are merely examples, and should not be construed as limiting in any manner.

DETAILED DESCRIPTION

Foreign objects can potentially damage one or more banknote-handling elements inside an automated teller machine. For example, if two or more of the banknotes are stapled together, the staple could jam a mechanism that processes the banknotes one-at-a-time. As another example, a rubber band around two or more of the banknotes could also jam the processing mechanism.

To detect these foreign objects, the system discussed below can apply pressure to a stack of banknotes. Any foreign object having a significant thickness, such as a paper clip, a staple, or a rubber band, can show up as a region having a relatively high pressure. For example, when a stack of banknotes is subject to pressure, a staple in a corner of one of the banknotes can produce a region of relatively high pressure in the corner of the stack.

In some examples, an automated teller machine can use an array of pressure sensors, such as piezo-resistive sensors, to detect the presence of foreign objects, such as staples, paper clips, or rubber bands, in a stack of banknotes. A user can insert a stack of banknotes into an automated teller machine. A pair of opposing clamping surfaces can apply pressure to the stack of banknotes. An array of pressure sensors on one or both of the clamping surfaces can sense non-uniformities in pressure over the area of the array. If circuitry coupled to the pressure sensors senses the presence of a high pressure area in the surface area of the banknotes, then the circuitry can generate a signal indicating that one or more foreign objects has been detected. The automated teller machine can then prompt the user to remove the stack of banknotes and remove the foreign object from the stack of banknotes.

Using pressure sensors to detect foreign objects in a stack of banknotes can improve over existing technologies. For example, a metal detector may be able to detect staples and metallic paper clips, but would miss a rubber band or a plastic paper clip in the stack of banknotes. Other technologies, such as X-ray imaging, can be prohibitively expensive or complex.

FIG. 1 shows an example of a system 100 that can detect the presence of a foreign object in a stack of banknotes 102, in accordance with some embodiments. In some examples, the system 100 can function as an automated teller machine. In other examples, the system 100 can function as any suitable device that can receive a stack of banknotes or other documents. The configuration of FIG. 1 is but one example; other configurations can also be used.

The system 100 can include a housing 104. In some examples, the housing 104 can include an exterior of a device, such as an automated teller machine. In other examples, the housing 104 can form a portion of an interior of a device, such as a compartment within a device.

The housing 104 can have a port 106 that is sized and shaped to receive a stack of banknotes 102. In some examples, a user can insert a stack of banknotes 102 through the port 106 into the housing 104. In some examples, the housing 104 can include a movable door 108 that can open and close the port 106. In other examples, a user can insert a stack of banknotes 102 into the port 106, where a gripping assembly can grip the banknotes 102 and transport the banknotes 102 to a location in the interior of the housing 104. The gripping assembly can be coupled to rollers, belts, and/or other suitable mechanisms that can transport banknotes 102 within a device.

A pair of opposing clamping surfaces 110 can be positioned inside the housing 104. The opposing clamping surfaces 110 can controllably apply pressure to the stack of banknotes 102. In some examples, one of the pair of opposing clamping surfaces 110 can remain in a fixed position, while an actuator 112 can move the other of the pair of opposing clamping surfaces 110 toward the fixed clamping surface. In other examples, the opposing clamping surfaces 110 can move toward each other, with an actuator 112 coupled to each clamping surface. The actuator or actuators 112 can apply enough force or pressure to sense the presence of a foreign object in the stack of banknotes 102, but not enough pressure to crush or damage the foreign object.

An array 200 of pressure sensors 202 (see FIG. 2) can be positioned on at least one of the pair of opposing clamping surfaces 110. The array 200 of pressure sensors 202 can measure the applied pressure across a surface area of the stack of banknotes 102. In some examples, the array 200 can have enough resolution to locate a foreign object to a particular quadrant of a banknote. In other examples, the array 200 can include a resolution of ten pressure sensors 202 on a side, eighteen pressure sensors 202 on a side, thirty pressure sensors 202 on a side, or more than thirty pressure sensors 202 on a side. In some examples, the array 200 can be two-dimensional, with different numbers of pressure sensors 202 along its two dimensions. In some examples, the pressure sensors 202 in the array 200 are piezo-resistive sensors. Piezo-resistive sensors are particularly well suited for sensing pressure, due to their stability over time and their long life expectancy. Other pressure sensors 202 can also be used, including strain gauges manufactured by chemical vapor deposition, strain gauges manufactured by sputtered thin film, variable capacitance, solid state, strain gauges manufactured with micromachined silicon, and others.

Circuitry 114 can be positioned in the housing 104 and coupled to the array of pressure sensors. In some examples, the circuitry 114 can include a processor, memory, and instructions stored in the memory that can be executed on the processor. In some examples, the circuitry 114 can include one or more dedicated processors or chips, which can execute instructions that are hard-wired into the processors or chips. In some examples, the circuitry 114 can receive and process electrical signals from the pressure sensors. In cases where the pressure sensors are piezo-resistive sensors, the circuitry 114 can drive the piezo-resistive sensors, can receive measurements of pressure from the piezo-resistive sensors, and can optionally process the plurality of pressure measurements obtained from the array of pressure sensors.

The circuitry 114 can determine whether the array of pressure sensors senses a presence of a high pressure area in the surface area of the banknotes. The circuitry 114 can, in response to sensing a high pressure area, further generate a signal indicating that one or more foreign objects have been detected in the stack of banknotes. Such a signal can include a voltage or current pulse, an elevated voltage, or an internal signal that a processor can use to trigger additional actions, such as opening a door 108 over the port 106, returning the stack of banknotes through the port 106, and/or displaying a message to a user to remove the stack of banknotes 102, then remove the foreign object from the stack of banknotes 102, then return the stack of banknotes 102 to the port 106. Other suitable signals can also be used.

There are many possible technique to sense a presence of a high pressure area in the surface area of the banknotes, from data returned from the array of pressure sensors. Two specific examples are provided below; other suitable techniques can also be used.

In a first example, the circuitry 114 can detect a maximum sensed pressure across the array of pressure sensors, detect a minimum sensed pressure across the array of pressure sensors, and compare the difference between the maximum sensed pressure and the minimum sensed pressure to a specified threshold. If the difference exceeds the specified threshold, the circuitry 114 can determine that a high pressure area is present in the surface area of the banknotes, and can take subsequent action. Subsequent action can include prompting a user to remove the stack of banknotes 102 through the port 106 and remove the foreign object from the stack of banknotes 102.

In a second example, the circuitry 114 can calculate a pressure gradient from the sensed pressure across the array of pressure sensors, calculate a maximum value of the absolute value of the pressure gradient across the array of pressure sensors, and compare the calculated maximum value to a specified threshold. If the calculated maximum value exceeds the specified threshold, the circuitry 114 can determine that a high pressure area is present in the surface area of the banknotes, and can take subsequent action. Subsequent action can include prompting a user to remove the stack of banknotes 102 through the port 106 and remove the foreign object from the stack of banknotes 102.

If the circuitry 114 does not sense the presence of a high pressure area in the surface area of the banknotes 102 (e.g., the circuitry senses the absence of a high pressure area in the surface area of the banknotes 102), then the circuitry 114 can activate a processing mechanism 116 in the housing 104 that can receive the stack of banknotes 102 from the pair of opposing clamping surfaces 110. The processing mechanism 116 can mechanically process the banknotes in the stack of banknotes 102, one at a time. The processing mechanism 116 can determine the denomination of each banknote, can check for authenticity of each banknote, and so forth.

The above two examples are but mere examples. Other suitable detection techniques can alternatively be used to determine whether or not a high pressure area is present in the surface area of the banknotes, from the pressure values measured by the array of pressure sensors.

Figure 2:
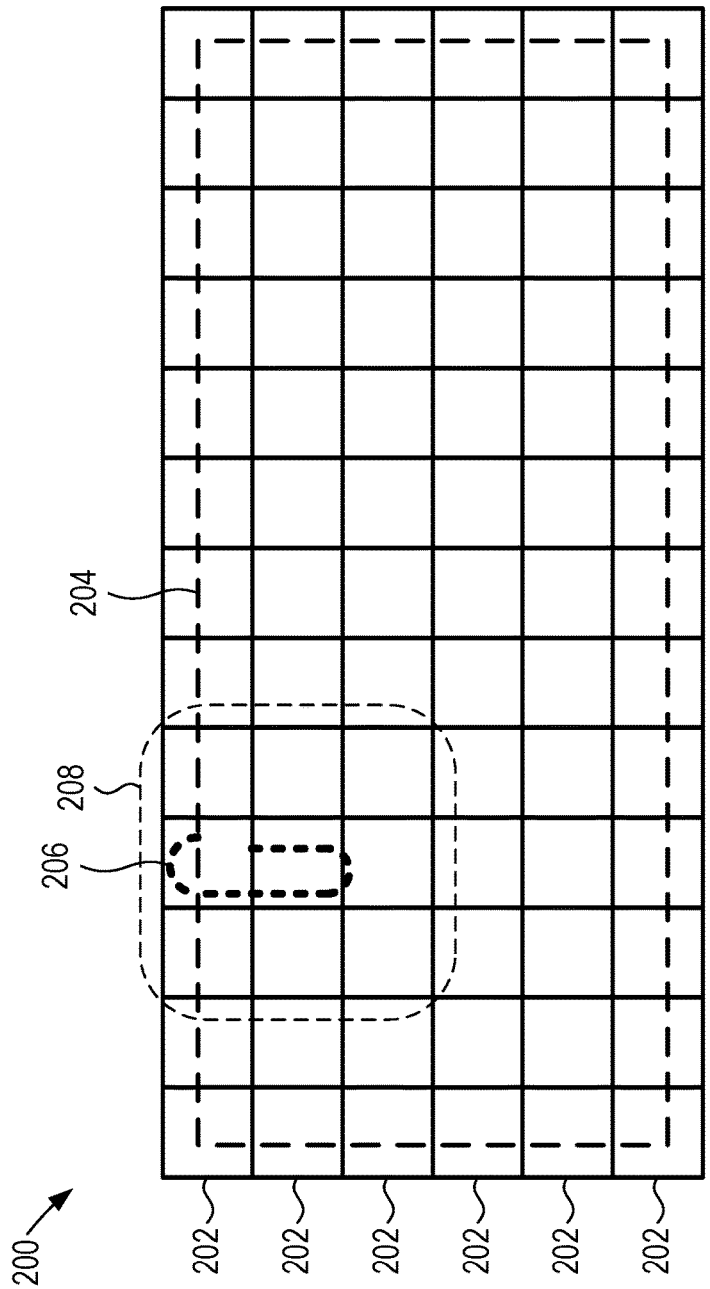
FIG. 2 shows an example of an array of pressure sensors, superimposed over a dashed outline of a banknote, in accordance with some embodiments.

FIG. 2 shows an example of an array 200 of pressure sensors 202, superimposed over a dashed outline of a banknote 204, in accordance with some embodiments. In the example of FIG. 2, a paper clip 206 can extend over the edge of one or more of the banknotes 204, in a stack of banknotes. When the opposing clamping surfaces apply pressure to the stack of banknotes 204, the paper clip 206 can elevate the pressure in a subset 208 of the array 200 of pressure sensors 202. In other words, the paper clip 206 can cause a high-pressure area that extends over the subset 208 of pressure sensors 202. The paper clip 206 of FIG. 2 is but one example of a foreign object; a staple, rubber band, or other foreign object can also produce a similar high-pressure area.

In some examples, the array 200 of pressure sensors 202 can extend over a surface area that is larger than the surface area of the stack of banknotes 204. For example, the surface area of the array 200 of pressure sensors 202 can have linear dimensions that are larger than comparable linear dimensions of the surface area of the stack of banknotes 204. For these examples, the array 200 can extend over a particular edge of a banknote 204 by a fraction of a pixel (e.g., a single pressure sensor 202 in the array 200), or a full pixel, or more than a full pixel. In some examples, the pixels or fractions of pixels that extend beyond an edge of the surface area of the banknotes 204 can be scaled suitably by the circuitry when determining whether a high pressure area is present. Such a scaling can include a relative fraction of surface area on the banknote 204, versus a fraction of surface area beyond the edge of the banknote 204.

Figure 3:
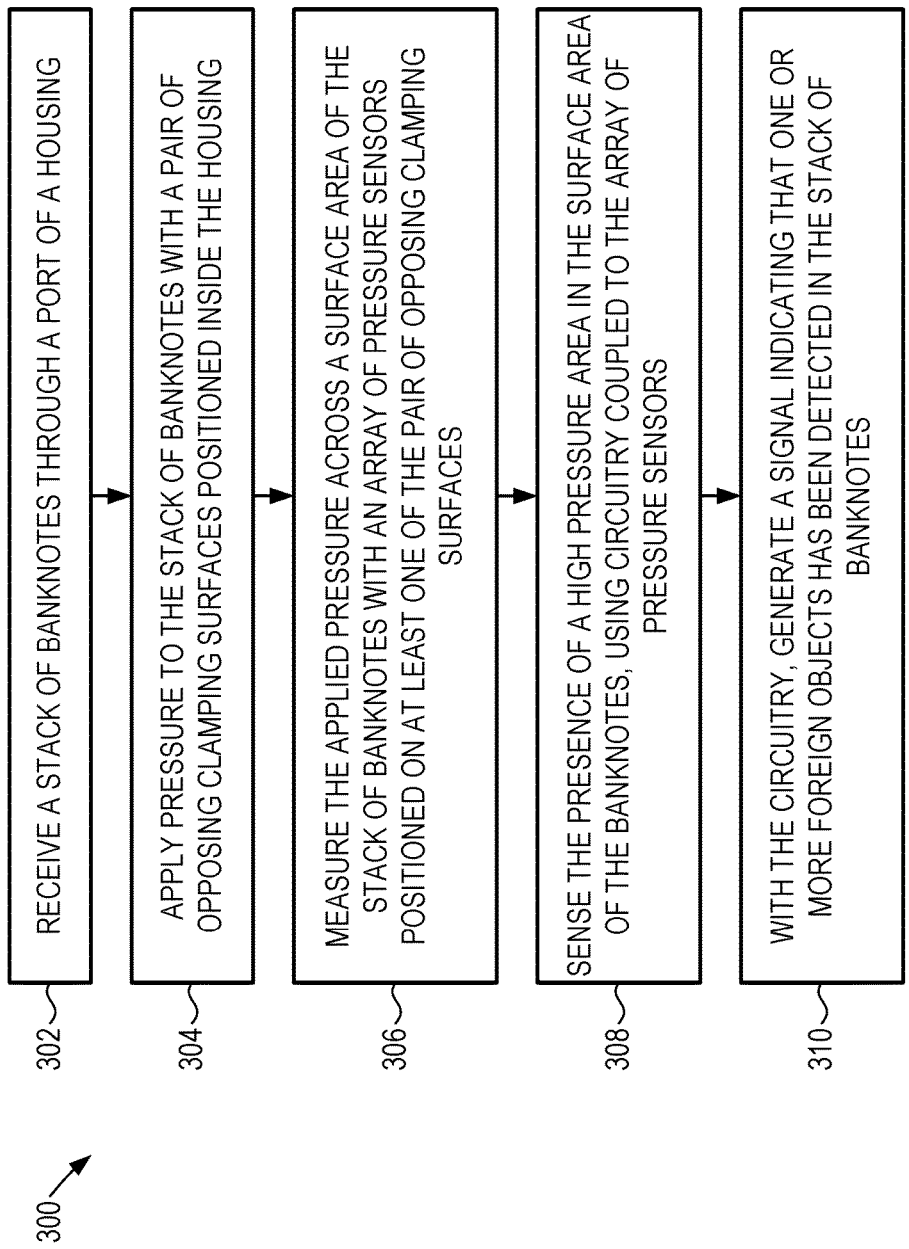
FIG. 3 shows an example of a method for detecting a presence of a foreign object in a stack of banknotes, in accordance with some embodiments.

FIG. 3 shows an example of a method 300 for detecting a presence of a foreign object in a stack of banknotes, in accordance with some embodiments. The method 300 can be executed by an automated teller machine, or by another suitable device that can receive a stack of banknotes.

At operation 302, the automated teller machine can receive a stack of banknotes through a port of a housing.

At operation 304, the automated teller machine can apply pressure to the stack of banknotes with a pair of opposing clamping surfaces positioned inside the housing.

At operation 306, the automated teller machine can measure the applied pressure across a surface area of the stack of banknotes with an array of pressure sensors positioned on at least one of the pair of opposing clamping surfaces. In some examples, the array of pressure sensors can extend over a surface area that is larger than the surface area of the stack of banknotes. In some examples, the surface area of the array of pressure sensors can have linear dimensions that are larger than comparable linear dimensions of the surface area of the stack of banknotes. In some examples, the pressure sensors in the array can be piezo-resistive sensors.

At operation 308, the automated teller machine can sense the presence of a high pressure area in the surface area of the banknotes, using circuitry coupled to the array of pressure sensors. In some examples, operation 408 can include detecting a maximum sensed pressure across the array of pressure sensors; detecting a minimum sensed pressure across the array of pressure sensors; and determining that a difference between the maximum sensed pressure and the minimum sensed pressure exceeds a specified threshold. In some examples, operation 408 can include calculating a pressure gradient from the sensed pressure across the array of pressure sensors; calculating a maximum value of the absolute value of the pressure gradient across the array of pressure sensors; and determining that the maximum value of the absolute value of the pressure gradient exceeds a specified threshold.

At operation 310, the automated teller machine can, with the circuitry, generate a signal indicating that one or more foreign objects has been detected in the stack of banknotes. In some examples, operation 310 can include prompting a user to remove the stack of banknotes through the port and remove the foreign object from the stack of banknotes.

It is instructive to detail what can happen when a system checks for, but does not find, a high pressure area in the stack of banknotes.

Such a system can include a housing having a port configured to receive a stack of banknotes. An actuator can move at least one of a pair of opposing clamping surfaces toward the other of the pair of opposing clamping surfaces, to controllably apply pressure to the stack of banknotes. An array of pressure sensors positioned on at least one of the pair of opposing clamping surfaces can measure the applied pressure across a surface area of the stack of banknotes.

Circuitry, positioned in the housing and coupled to the array of pressure sensors, can sense the absence of a high pressure area in the surface area of the banknotes. For example, the circuitry can detect a maximum sensed pressure across the array of pressure sensors, detect a minimum sensed pressure across the array of pressure sensors, and determine that a difference between the maximum sensed pressure and the minimum sensed pressure does not exceed a specified threshold. As another example, the circuitry can calculate a pressure gradient from the sensed pressure across the array of pressure sensors, calculate a maximum value of the absolute value of the pressure gradient across the array of pressure sensors, and determine that the maximum value of the absolute value of the pressure gradient does not exceed a specified threshold.

Once the circuitry has sensed the absence of a high pressure area in the surface area of the banknotes, the circuitry can determine that no foreign object is present in the stack of banknotes. The banknotes can then be processed. For example, a processing mechanism can receive the stack of banknotes from the pair of opposing clamping surfaces and mechanically process the banknotes in the stack of banknotes, one at a time.

Figure 4:
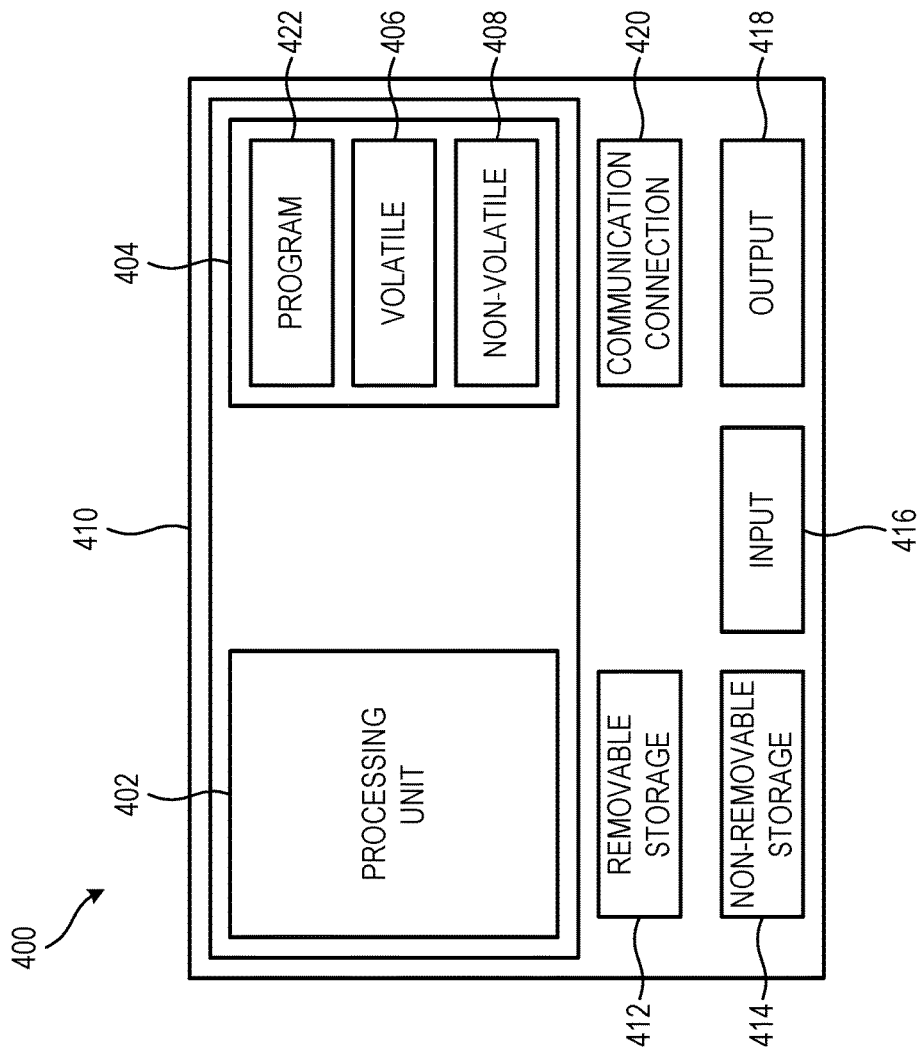
FIG. 4 shows a block diagram of an example of a terminal, such as an automated teller machine, in accordance with some embodiments.

FIG. 4 shows a block diagram of an example of a terminal 400, such as an automated teller machine, in accordance with some embodiments. The example of FIG. 4 is but one configuration for a terminal; other configurations can also be used.

In one embodiment, multiple such terminals 400 are utilized in a distributed network to implement multiple components in a transaction based environment. An object-oriented, service-oriented, or other architecture may be used to implement such functions and communicate between the multiple terminals 400 and components.

One example of a terminal 400, in the form of a computer 410, can include a processing unit 402, memory 404, removable storage 412, and non-removable storage 414. Memory 404 may include volatile memory 406 and non-volatile memory 408. Computer 410 may include, or have access to a computing environment that includes, a variety of computer-readable media, such as volatile memory 406 and non-volatile memory 408, removable storage 412 and non-removable storage 414. Computer storage includes random access memory (RAM), read only memory (ROM), erasable programmable read-only memory (EPROM) and electrically erasable programmable read-only memory (EEPROM), flash memory or other memory technologies, compact disc read-only memory (CD-ROM), Digital Versatile Disks (DVD) or other optical disk storage, magnetic cassettes, magnetic tape, magnetic disk storage or other magnetic storage devices, or any other medium capable of storing computer-readable instructions. Computer 410 may include or have access to a computing environment that includes input 416, output 418, and a communication connection 420. The computer may operate in a networked environment using a communication connection to connect to one or more remote computers, such as database servers. The remote computer may include a personal computer (PC), server, router, network PC, a peer device or other common network node, or the like. The communication connection may include a Local Area Network (LAN), a Wide Area Network (WAN) or other networks.

Computer-readable instructions stored on a computer-readable medium are executable by the processing unit 402 of the computer 410. A hard drive, CD-ROM, and RAM are some examples of articles including a non-transitory computer-readable medium. For example, a computer program 422 with instructions for the computer 410, according to the teachings of the present disclosure, may be included on a CD-ROM and loaded from the CD-ROM to a hard drive. The computer-readable instructions allow computer 410 to provide generic access controls in a COM based computer network system having multiple users and servers.

What is claimed is:

1. A system, comprising:
   a housing having a port that is sized and shaped to receive a stack of banknotes;
   a pair of opposing clamping surfaces positioned inside the housing and configured to controllably apply pressure to the stack of banknotes;
   an array of pressure sensors positioned on at least one of the pair of opposing clamping surfaces and configured to measure the applied pressure across a surface area of the stack of banknotes; and
   circuitry positioned in the housing, coupled to the array of pressure sensors, and configured to:
      sense a presence of a high pressure area in the surface area of the banknotes, wherein sensing the presence of the high pressure area comprises: calculating a pressure gradient from the sensed pressure across the array of pressure sensors; calculating a maximum value of the absolute value of the pressure gradient across the array of pressure sensors; and determining that the maximum value of the absolute value of the pressure gradient exceeds a specified threshold; and
      generate a signal indicating that one or more foreign objects has been detected in the stack of banknotes.

2. The system of claim 1, wherein sensing the presence of the high pressure area further comprises:
   detecting a maximum sensed pressure across the array of pressure sensors;
   detecting a minimum sensed pressure across the array of pressure sensors; and
   determining that a difference between the maximum sensed pressure and the minimum sensed pressure exceeds a specified threshold.

3. The system of claim 1, wherein the circuitry is further configured to prompt a user to remove the stack of banknotes through the port and remove the foreign object from the stack of banknotes.

4. The system of claim 1, wherein the array of pressure sensors extends over a surface area that is larger than the surface area of the stack of banknotes.

5. The system of claim 4, wherein the surface area of the array of pressure sensors has linear dimensions that are larger than comparable linear dimensions of the surface area of the stack of banknotes.

6. The system of claim 1, further comprising an actuator coupled to the circuitry and configured to move at least one of the pair of opposing clamping surfaces toward the other of the pair of opposing clamping surfaces.

7. The system of claim 1, wherein the pressure sensors in the array are piezo-resistive sensors.

8. A method, comprising:
   detecting a foreign object present within a stack of received banknotes upon sensing, by an array of pressure sensors, a high pressure area within a surface area of the stack of banknotes to which a pressure is applied by a pair of opposing clamping surfaces within which the array of pressure sensors is present, wherein sensing the presence of the high pressure area comprises: calculating a pressure gradient from the sensed pressure across the array of pressure sensors; calculating a maximum value of the absolute value of the pressure gradient across the array of pressure sensors; and determining that the maximum value of the absolute value of the pressure gradient exceeds a specified threshold; and
   outputting a signal indicating that at least foreign objects has been detected in the stack of banknotes.

9. The method of claim 8, wherein sensing the presence of the high pressure area further comprises:
   detecting a maximum sensed pressure across the array of pressure sensors;
   detecting a minimum sensed pressure across the array of pressure sensors; and
   determining that a difference between the maximum sensed pressure and the minimum sensed pressure exceeds a specified threshold.

10. The method claim 8, further comprising:
    receiving the stack of banknotes through a port of a housing; and
    prompting a user to remove the stack of banknotes through the port and remove the foreign object from the stack of banknotes.

11. The method of claim 8, wherein the array of pressure sensors extends over a surface area that is larger than the surface area of the stack of banknotes.

12. The method of claim 11, wherein the surface area of the array of pressure sensors has linear dimensions that are larger than comparable linear dimensions of the surface area of the stack of banknotes.

13. The method of claim 8, wherein the pressure sensors in the array are piezo-resistive sensors.

14. A system, comprising:
    a housing having a port configured to receive a stack of banknotes;
    a pair of opposing clamping surfaces positioned inside the housing and configured to controllably apply pressure to the stack of banknotes;
    an array of pressure sensors positioned on at least one of the pair of opposing clamping surfaces and configured to measure the applied pressure across a surface area of the stack of banknotes;
    circuitry positioned in the housing, coupled to the array of pressure sensors, and configured to sense the absence of a high pressure area in the surface area of the banknotes, wherein sensing the absence of the high pressure area comprises: calculating a pressure gradient from the sensed pressure across the array of pressure sensors; calculating a maximum value of the absolute value of the pressure gradient across the array of pressure sensors; and determining that the maximum value of the absolute value of the pressure gradient does not exceed a specified threshold; and
    a processing mechanism configured to receive the stack of banknotes from the pair of opposing clamping surfaces and mechanically process the banknotes in the stack of banknotes, one at a time.

15. The system of claim 14, wherein sensing the absence of the high pressure area further comprises:
    detecting a maximum sensed pressure across the array of pressure sensors;
    detecting a minimum sensed pressure across the array of pressure sensors; and
    determining that a difference between the maximum sensed pressure and the minimum sensed pressure does not exceed a specified threshold.

16. The system of claim 14, further comprising an actuator coupled to the circuitry and configured to move at least one of the pair of opposing clamping surfaces toward the other of the pair of opposing clamping surfaces.

17. The system of claim 14, wherein:
the array of pressure sensors extends over a surface area that is larger than the surface area of the stack of banknotes;
the surface area of the array of pressure sensors has linear dimensions that are larger than comparable linear dimensions of the surface area of the stack of banknotes; and
the pressure sensors in the array are piezo-resistive sensors.

* * * * *